United States Patent
Chiang et al.

(10) Patent No.: US 10,534,450 B2
(45) Date of Patent: Jan. 14, 2020

(54) STYLUS WITH MAGNETIC INDUCTION WHEEL

(71) Applicant: HOLY STONE ENTERPRISE CO., LTD., Taipei (TW)

(72) Inventors: Chiu-Lin Chiang, Taipei (TW); Ming-Hung Chien, Taipei (TW); Chang-Ching Lin, Taipei (TW)

(73) Assignee: HOLY STONE ENTERPRISE CO., LTD., Taipei (TW)

( * ) Notice: Subject to any disclaimer, the term of this patent is extended or adjusted under 35 U.S.C. 154(b) by 39 days.

(21) Appl. No.: 15/878,625

(22) Filed: Jan. 24, 2018

(65) Prior Publication Data

US 2018/0224954 A1    Aug. 9, 2018

(30) Foreign Application Priority Data

Jan. 25, 2017  (TW) .............................. 106102949 A
Jan. 18, 2018  (TW) .............................. 107101889 A

(51) Int. Cl.
    *G06F 3/0354*  (2013.01)
(52) U.S. Cl.
    CPC ................................ *G06F 3/03545* (2013.01)
(58) Field of Classification Search
    CPC .................................................. G06F 3/03545
    See application file for complete search history.

(56) References Cited

U.S. PATENT DOCUMENTS

| | | | | |
|---|---|---|---|---|
| 2013/0009907 | A1* | 1/2013 | Rosenberg | G06F 3/046 345/174 |
| 2014/0194825 | A1* | 7/2014 | Nielsen | A61M 5/24 604/189 |
| 2015/0205383 | A1 | 7/2015 | Chang | |
| 2015/0238687 | A1* | 8/2015 | Novakovic | A61M 5/158 604/502 |
| 2016/0154485 | A1* | 6/2016 | Kampt | G06F 3/03545 345/179 |
| 2016/0325041 | A1* | 11/2016 | Hoeholt | A61M 5/1452 |
| 2016/0347110 | A1* | 12/2016 | Chiu | B43K 23/001 |

FOREIGN PATENT DOCUMENTS

| | | |
|---|---|---|
| CN | 205334393 U | 6/2016 |
| TW | 201530370 A | 8/2015 |

\* cited by examiner

*Primary Examiner* — Nelson M Rosario
*Assistant Examiner* — Scott D Au
(74) *Attorney, Agent, or Firm* — Muncy, Geissler, Olds & Lowe, P.C.

(57) ABSTRACT

The present disclosure illustrates a stylus with magnetic induction wheel. In the stylus, a pen holder includes a stylus head and a pen cap, and the pen holder is defined with a hollow accommodation space having a hole. A wheel is assembled inside the accommodation space and aligned with the hole, and a central axis is protruded on and extended from two opposite sides of the wheel to abut with the stylus head and the pen cap. A magnetic component is disposed on the central axis, and a magnetic induction device is disposed in the accommodation space to sense a variation of angular momentum or angular velocity of the magnetic field lines of the S and N magnetic poles of the magnetic component. As a result, the user can use the stylus to control an electronic device more easily.

8 Claims, 11 Drawing Sheets

```
┌─ A01
│ A part of the periphery of the wheel is exposed out of the hole of the
│ pen holder, so that the user can operate and rotate the wheel by single
│ hand
└─
     ↓
┌─ A02
│ When the wheel is rotated, the angular momentum or the angular
│ velocity of the magnetic field lines produced by the S magnetic pole
│ and the N magnetic pole of the magnetic component on the central
│ axis of the wheel varies
└─
     ↓
┌─ A03
│ Two sensing points of the magnetic induction device senses the
│ variation of the magnetic field lines of the S magnetic pole and the
│ N magnetic pole of the magnetic component, and the magnetic
│ induction device then converts the sensed data into the movement
│ signal per unit time of rotation of the wheel
└─
     ↓
┌─ A04
│ The movement signal per unit time is transmitted to the circuit board
│ having the wireless signal module, and the wireless signal is then
│ transmitted to the preset electronic device through the wireless signal
│ module wirelessly
└─
     ↓
┌─ A05
│ After the wireless signal receiving unit built in the preset electronic
│ device receives the wireless signal, the wireless signal is transmitted
│ to the processing unit (such as OS system or the signal processor)
│ built in the preset electronic device
└─
     ↓
┌─ A06
│ The stylus is able to precisely control the movement distance of the
│ window screen displayed on the screen of the preset electronic
│ device, so as to smoothly operate the sliding action of the window
│ screen displayed on the screen of the preset electronic device
└─
```

*FIG.8*

STYLUS WITH MAGNETIC INDUCTION WHEEL

This application claims the priority benefit of Taiwan patent application numbers 106102949 and 107101889, filed respectively on Jan. 25, 2017 and Jan. 18, 2018.

BACKGROUND OF THE INVENTION

1. Field of the Invention

The present disclosure relates to a stylus with a magnetic induction wheel. More particularly, the present disclosure relates to a stylus having a wheel, and the wheel can be operated to control a page browse operation of a screen of a preset electronic device;
furthermore, the wheel and a magnetic induction device is assembled inside an accommodation space in a pen holder, and magnetic induction coupling can be formed between two sensing points of the magnetic induction device and the magnetic component on a central axis of the wheel, thereby achieving the purpose of using a stylus head at a side of the pen holder to control the preset electronic device.

2. Description of the Related Art

With continuous progress of the electronic technology, the portable electronic devices for example, notebook computers, tablet computers or smartphones, can be carried more easily and have been widely applied. Furthermore, the portable electronic devices are not only in young generation's good graces, but also become more popular in junior generation, middle-aged generation and older generation. In recent years, almost everyone holds a portable device, particularly the portable electronic device, such as the tablet computer or the smartphone, become increasingly welcome by people of all ages, and nowadays there are many phubbers operating portable electronic devices for a long time every day, in the social environment. Most portable electronic devices are equipped with touch screens, and the user must use finger or stylus to slide or touch the touch screen to perform browse operation or page changing operation. However, the user's finger may touch a larger area on the screen of the electronic device, so the user usually slides too many pages accidentally during the slide operation and touch operation, and it is not easy for the user to browse or change page precisely by using the finger touch control manner. As a result, the user has to repeat up/down slide operations to reach the desired page, which results in inconvenience of operating the screen of the electronic device.

Some electronic devices are provided with styluses for touch control, so that the user can touch the screen of the electronic device by a pen head of the stylus for control. The development trend of an intelligent stylus is towards a multifunctional design, and the intelligent stylus has to be equipped with more control components, to enable the user to immediately move a position of a cursor or change window screen. However, adding more control components makes the structural relationship between the components inside the stylus complex, and it causes the increasing size of the intelligent stylus.

In recent years, the size and the diameter of the intelligent stylus of the electronic device are larger than that of a normal pen, so it is not easy for the user to hold the intelligent stylus for operation. When the pen body is designed to have more functions, the size of the pen body becomes larger and the user is not easy to hold the pen body. For example, a general mouse applied to a desktop computer has functions of a left button, a right button, a middle wheel for up/down scrolling window, a power switch button, and the size of the intelligent stylus may be increased greatly if the all functions of the mouse are implemented on the intelligent stylus. Furthermore, among the other components, the wheel equipped on the stylus may occupy the most volume, and the reason is that the middle wheel configured to up/down scroll the window screen may have more gears, signal sensors and a correction module in cooperation with each other, so the wheel play a key role in increased size of the stylus compared with the left button, the right button, the power switch button and the shortcut button configured to start or stop signal.

There is a conventional stylus having a wheel of which an outer edge is exposed out of the pen body. For example, the China Patent No. CN205334393U discloses a pen-type wireless mouse, as shown in FIG. 1, the pen body is provided with, in sequential order from top to down, a left button A, a right button B, a wheel C and a switch D disposed on a side thereof. The wheel C is disposed adjacent to the left button A and the right button B, and corresponds in position to the user's index finger when the user holds the pen-type wireless mouse. However, compared with thumb, the index finger of the user's dominant hand is disadvantageous in rotating the wheel. Obviously, there is still much room for improvement in operability of the user interface. Furthermore, an optical sensor E mounted in the pen body is used for sensing and has to consume more power of a battery F.

In order to develop more friendly operability for the user, Taiwan Patent Application Publication No. 201530370 discloses a stylus using a rotational pushing member to replace the pushing function button, so as to prevent the user from mistakenly touching the function button. According to a variation of the electric signals of the control regions inside the rotational pushing member, the stylus can be controlled to be at the turn on state or turn off state. According to whether the conductive elastic member is in direct contact with control region of the pen body, different input signals can be switched to determine the turn on state or the turn off state of the stylus. However, there is still much room for improvement in design freedom of the internal mechanism of the stylus. Therefore, what is needed is to develop a new intelligent stylus to solve above-mentioned problems.

SUMMARY OF THE INVENTION

The stylus of the present disclosure modifies the concept the rotational pushing member in prior art, and implements the sensing function by a magnetic coupling manner, so as to solve the problem that the size of the stylus becomes too large because of adding excessive components inside the stylus to up/down scroll the window screen. As a result, the user can hold the stylus of the present disclosure more easily and operate the stylus more freely.

An objective of the present disclosure is that the stylus comprises a pen holder, a wheel and a magnetic induction device, the pen holder includes a stylus head disposed an end thereof, a pen cap is disposed at other end and defined a hollow accommodation space formed inside, and the accommodation space is provided with a hole formed a side thereof and penetrating through to the outside, the wheel is assembled inside the accommodation space of the pen holder, and aligned with the hole, and a central axis is protruded on and extended from two opposite sides of the wheel to abut with the stylus head and the pen cap at two opposite sides of the accommodation space of the pen holder, a magnetic component is disposed on the central axis, a magnetic induction device is disposed on the inner wall of the accommodation space of the pen holder corresponding in position to the magnetic component, so that magnetic induction coupling is simultaneously formed between the two sensing points of the magnetic induction device and the magnetic component, and the magnetic induction device can sense a variation of angular momentum or angular velocity of the magnetic field lines of the S and N magnetic poles of the magnetic component, and convert the sensed data into the movement per unit time of the wheel, transmits the converted data to the wireless receiving unit of the preset electronic device by a wireless transmission manner, and the received data is then processed by the OS system or the signal processor of the processing unit. As a result, the user can control the electronic device more easily.

Other objective of the present disclosure is that the user can rotate the wheel of the pen holder to control the preset wireless control function of the electronic device, and when the wheel is rotated, the angular momentum or the angular velocity of the magnetic field line of the S and N magnetic poles of the magnetic component on the central axis of the wheel are varied, and the two sensing point of the magnetic induction device can sense the variation of the magnetic field line of the S and N magnetic poles of the magnetic component; after the two sensing point senses the variation of the magnetic field lines of the different magnetic poles, the magnetic induction device converts the sensed data into the electrical signal indicative of the movement per unit time of the wheel, and the wireless transmission module of the circuit board, such as a Bluetooth or RF transmitting unit, transmits the wireless electrical signal to the wireless receiving module of the preset electronic device, such as a Bluetooth or RF wireless receiving unit; and, the received signal is transmitted to the OS system or the signal processor of the built-in processing unit. As a result, the user can use the stylus to scroll up or down the screen of the preset electronic device.

Other objective of the present disclosure is that the pen holder of the stylus comprises two rods opposite to each other, and a stylus head and a pen cap separately disposed at two opposite ends of the two rods, the hollow accommodation space is formed inside the two rods between the stylus head and the pen cap, and the accommodation space is provided with the hole formed on one of the two rods to expose out of a part of the wheel; and, a length of the wheel is equal to or shorter than that of the hole, a diameter of the wheel is larger than a width of the hole, and the two opposite ends of the central axis of the wheel are abutted with the pen cap and the stylus head; butt joint parts are disposed between the stylus head and the pen cap on the two opposite ends of the two rods, and configured to assembled with each other, and the butt joint parts can be the inner thread and the outer thread which can be locked with each other, or the axle and the axle hole which can be tightly fitted with each other, or the tenon and the fastening slot which can be rotated to position with each other.

Another purpose of the present disclosure is that the diameter of the wheel is shorter than or equal to the internal diameter of the accommodation space of the pen holder, the wheel is provided with a non-slip the touch surface formed on an outer periphery thereof, and the touch surface can have straight strip patterns, diagonal stripe patterns, mesh patterns, dot patterns, triangular patterns, diamond patterns, or strip pattern or dot pattern with recessed or protruded geometrical shape, so as to provide anti-slip function to facilitate rotate the wheel.

Another objective of the present disclosure is that the wheel is provided with an annular magnetic component disposed on the central axis above or below the hole of the pen holder, the magnetic induction device disposed on the inner wall of the accommodation space of the pen holder opposite to the magnetic component; the magnetic component can be an annular magnet, and the magnetic induction device can be a Hall sensor or a Hall-effect sensor, which has the two sensing points to sense the variation of angular momentum or angular velocity of the magnetic field lines of different magnetic poles of the magnetic component, and the two sensing points on the magnetic induction device are located on the same diagonal line or at different two corner positions; and, the magnetic induction device can be disposed on the inner wall of the accommodation space inside the pen holder and at a 45° of angle with the central axis, so that the two sensing points of the magnetic induction device and the magnetic component can be located at the same two-dimensional plane to form the magnetic coupling state, thereby measuring the variance of the rotational angle of the magnetic component on the two-dimensional plane.

Another objective of the present disclosure is to provide a stylus including a pen holder, a rotating roller and a magnetic induction device. The pen holder includes a stylus head disposed on an end thereof and a pen cap on the other end thereof, and the pen holder defines a hollow accommodation space formed inside and provided with a hole formed on a side of the accommodating space and penetrated through to the outside. The wheel is assembled in the accommodating space of the pen holder and aligned with the hole, and the wheel is in a hollow shape, and a central axis is protruded and extended out of the two sides of the wheel to respectively abut against the stylus head and pen cap on the two opposite sides of the accommodating space of the pen holder. The central axis is not provided with any magnetic component; instead, the magnetic component is disposed inside the hollow wheel. Preferably, the magnetic component is an annular magnet. In order to sense the change in the angular momentum or angular velocity of the magnetic field lines of the S pole and the N pole of the magnetic element caused by the rotation of the wheel, a magnetic induction device is disposed on the central axis at the hollow portion of the wheel. The magnetic induction device includes two sensing points located at different corner positions to form magnetic coupling with the magnetic component, and the sensed data is converted into an offset of the wheel per unit time, and the offset is transmitted, by wireless transmission manner, to the wireless receiving unit of the preset electronic device. Next, the offset is processed by the OS executed in the processing unit or a signal processor, so as to facilitate the user to control the preset electronic device by operating the stylus. Furthermore, the position of the magnetic induction device can be changed upon demand as long as the two sensing points and the annular magnet are still in the same two-dimensional plane or the diagonal line where the two sensing points are disposed is directly perpendicular to the central axis, so that the two sensing points of the magnetic induction device can sense the change in the angular momentum or the angular velocity of the magnetic field lines, and the sensed data is also converted into the offset of the wheel per unit time. As a result, the same final effect can be achieved.

BRIEF DESCRIPTION OF THE DRAWINGS

The structure, operating principle and effects of the present disclosure will be described in detail by way of various embodiments which are illustrated in the accompanying drawings.

FIG. 8 is a flowchart showing the steps of an operation method of the present disclosure.

DETAILED DESCRIPTION OF THE PREFERRED EMBODIMENTS

Figure 1:
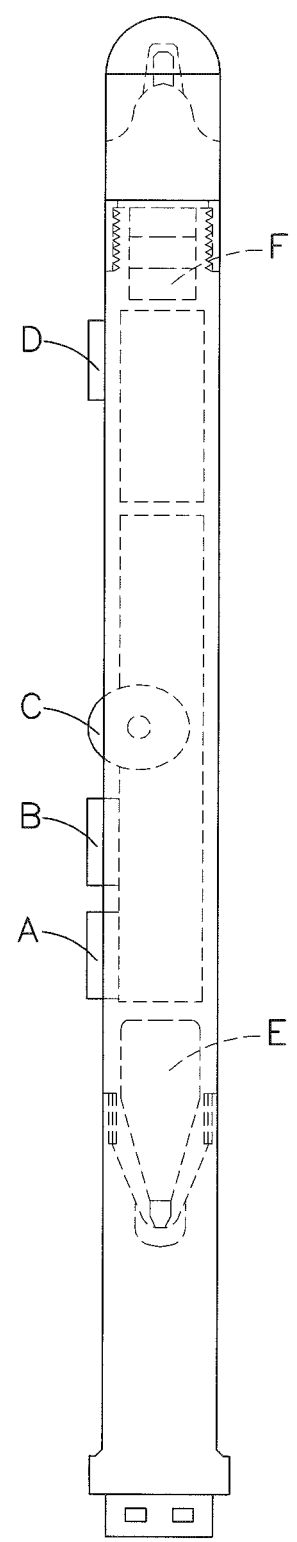
FIG. 1 is a side view of conventional pen-type wireless mouse.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of components in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various components, these components should not be limited by these terms. These terms are used only for the purpose of distinguishing one component from another component. Thus, a first component discussed herein could be teamed a second component without altering the description of the present disclosure. As used herein, the term "or" includes any and all combinations of one or more of the associated listed items.

Figure 2:
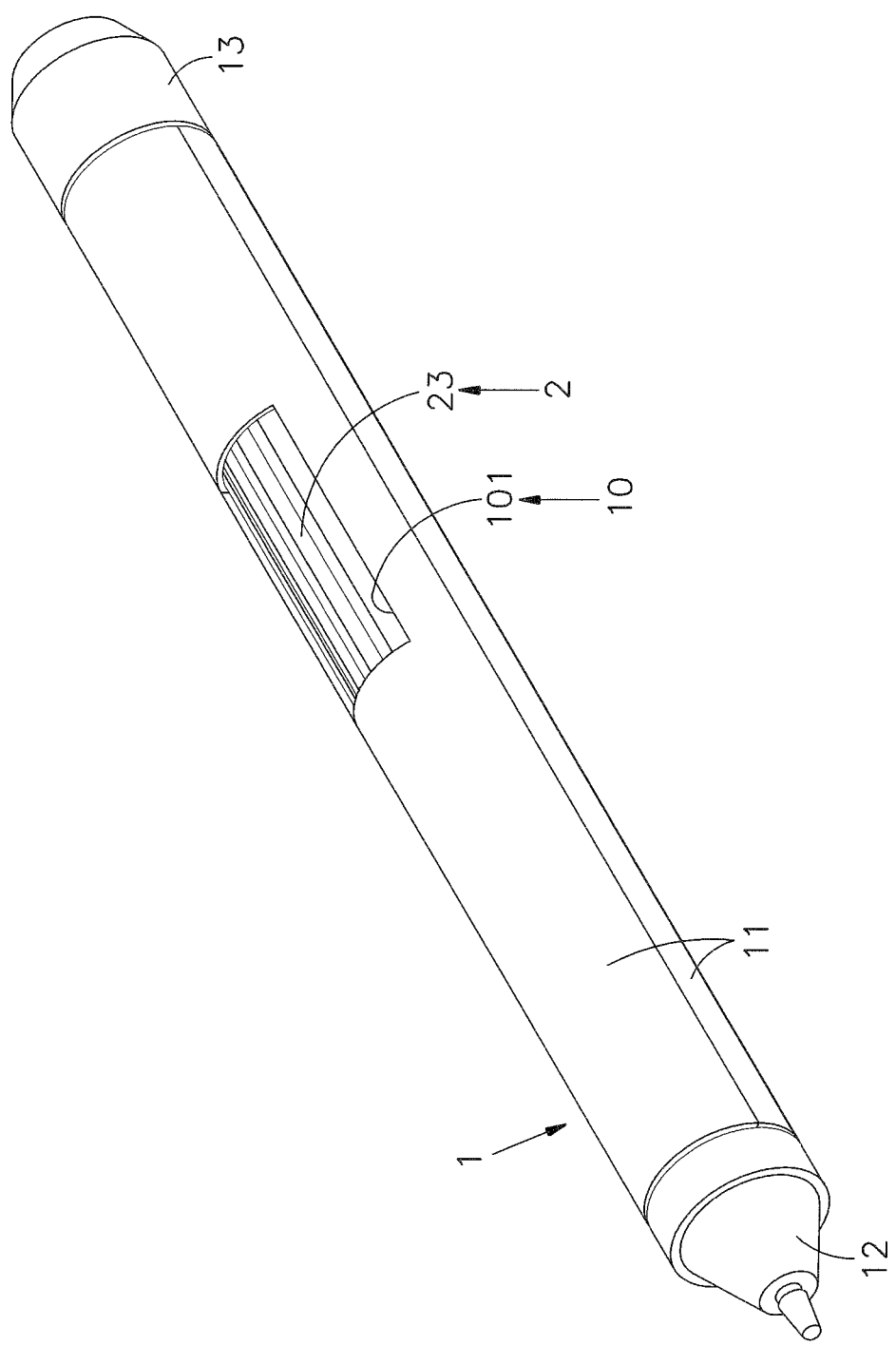
FIG. 2 is an elevational view of a stylus of the present disclosure.
Figure 3:
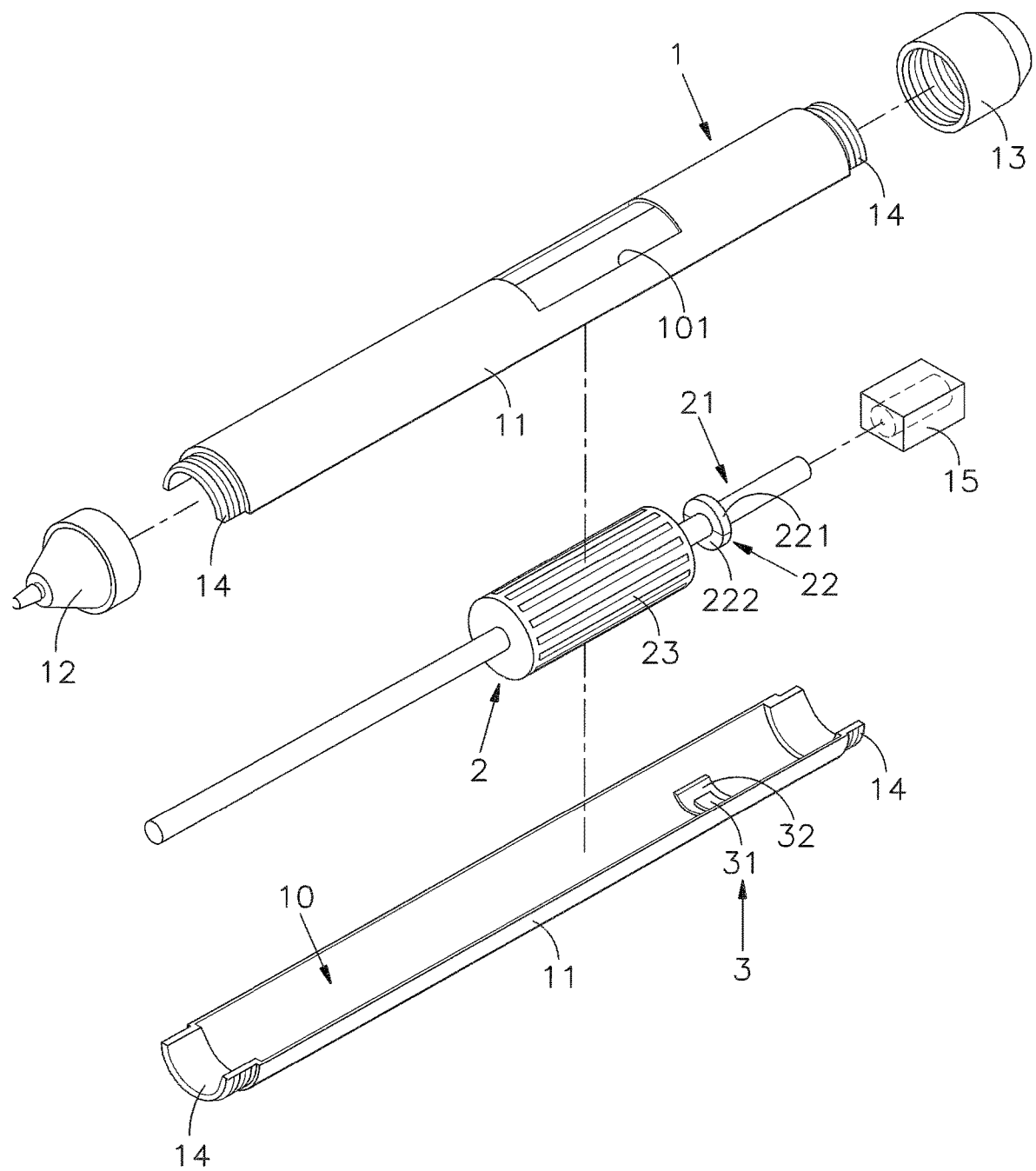
FIG. 3 is an exploded view of the stylus of the present disclosure.
Figure 4:
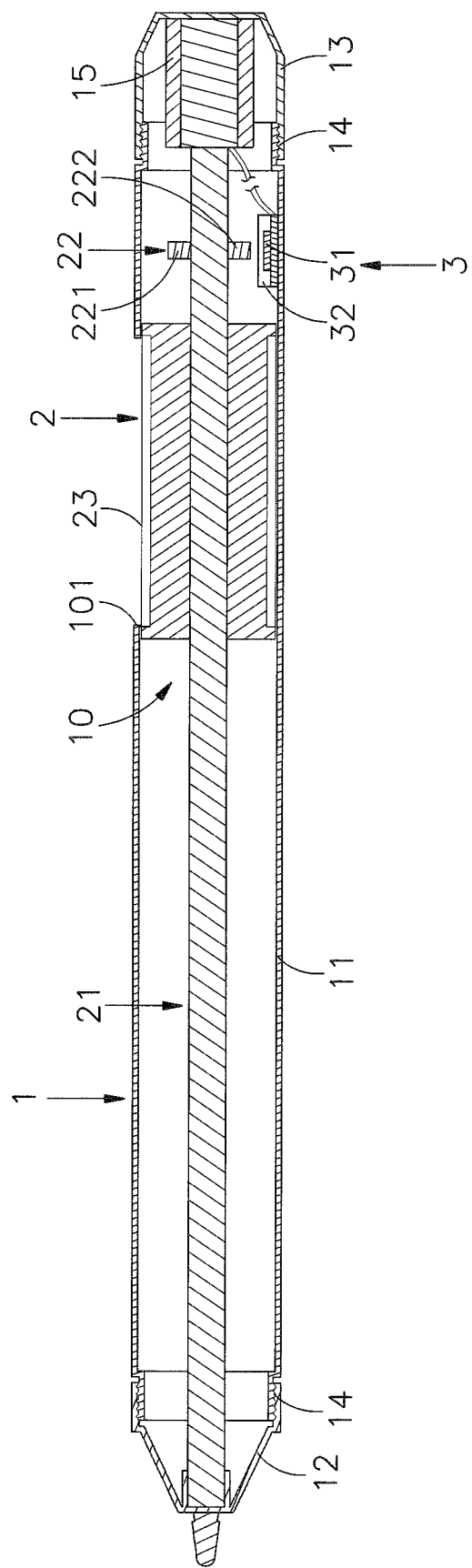
FIG. 4 is a sectional side view of the stylus of the present disclosure.

Please refer to FIGS. 2, 3 and 4, which show elevational view, exploded view and sectional side view of the stylus of the present disclosure, respectively. The stylus comprises a pen holder 1, a wheel 2 and a magnetic induction device 3.

The pen holder 1 includes two rods 11 opposite to each other, a stylus head 12 and a pen cap 13 separately located at two opposite ends of each of the two rods 11, and butt joint parts 14 separately disposed between the two opposite ends of the two rods 11 and the stylus head 12 and the pen cap 13. The two opposite ends of the two rods 11 can be combined with the stylus head 12 and the pen cap 13 through the butt joint parts 14. A hollow accommodation space 10 is defined inside the two rods 11, and provided with a hole 101 formed on a surface of the rod 11 and penetrated through to the outside.

The wheel 2 includes a central axis 21 protruded on and extended outwardly from two opposite sides thereof respectively, and a magnetic component 22 are disposed on one end of the central axis 21.

The magnetic induction device 3 can be a Hall sensor 31 having the two sensing points 31a and 31b located on the same diagonal line or at different two corner positions. The magnetic induction device 3 further includes a circuit board 32 or is electrically coupled to the circuit board 32. The circuit board 32 can be provided with a wireless signal module, such as a Bluetooth or RF wireless signal emission unit for transmitting wireless signal.

In order to assemble the components, the wheel 2 is assembled in the accommodation space 10 inside the two rods 11 of the pen holder 1 and aligned with the hole 101 of the rod 11, and a part of the circumference of the wheel 2 is exposed out of the hole 101, the two opposite ends of the central axis 21 of the wheel 2 are separately abutted with the stylus head 12 and the pen cap 13 located at two opposite sides of the accommodation space 10, the wheel 2 is rotatable axially in the accommodation space 10 and the hole 101, the magnetic induction device 3 is disposed on the inner wall of the accommodation space 10 inside the two rods 11 opposite to the wheel 2, the magnetic induction device 3 can be aligned with the periphery of the wheel 2. When the wheel 2 is rotated, the magnetic component 22 is also rotated at the same time and is sensed by the two sensing points 31a and 31b of the magnetic induction device 3 based on the magnetic coupling effect, so as to provide the variation of angular momentum or angular velocity of the magnetic field line of the S and N magnetic poles 221 and 222 of the magnetic component 22 with respect to the two sensing points 31a and 31b, the pen holder 1, the wheel 2 and the magnetic induction device 3, assembled to form the stylus of the present disclosure.

In order to assemble the components, the wheel 2 is assembled in the accommodation space 10 inside the two rods 11 of the pen holder 1, to align the wheel 2 with the hole 101 of the rod 11, a part of the periphery of the wheel 2 is exposed out of the hole 101, and the two opposite ends of the central axis 21 of the wheel 2 are separately abutted with the stylus head 12 and the pen cap 13 located at two opposite sides of the accommodation space 10. The wheel 2 is rotatable axially in the accommodation space 10 and the hole 101, a magnetic induction device 3 is disposed on the inner wall of the accommodation space 10 inside the two rods 11 opposite to the wheel 2, the magnetic induction device 3 can be aligned with the periphery of the wheel 2. When the wheel 2 is rotated, the magnetic component 22 is also rotated at the same time and is sensed by the two sensing points 31a and 31b of the magnetic induction device 3 based on the magnetic coupling effect, so as to provide the variation of angular momentum or angular velocity of magnetic field lines of the S and N magnetic poles 221 and 222 of the magnetic component 22 with respect to the two sensing points 31a and 31b. As a result, the pen holder 1, the wheel 2 and the magnetic induction device 3 can be assembled to form the stylus of the present disclosure.

The wheel 2 is assembled in the hole 101 of the pen holder 1, and a length of the wheel 2 is equal to or shorter than that of the hole 101, a diameter of the wheel 2 is larger than a width of the hole 101, and the diameter of the wheel 2 is shorter than or equal to an internal diameter of the accommodation space 10 of the pen holder 1. The wheel 2 is provided with a non-slip touch surface 23 formed on an outer periphery thereof; preferably, the touch surface 23 can have straight strip patterns, diagonal stripe patterns, mesh patterns, dot patterns, triangular patterns, diamond patterns or other patterns in geometrical shapes; or, the touch surface 23 can be the strip surface or dot surface with recessed patterns, protruded patterns, or a combination thereof disposed alternatively. As a result, the touch surface 23 of the wheel 2 can have an anti-slip effect to facilitate the user to rotate the wheel 2.

Figure 5:
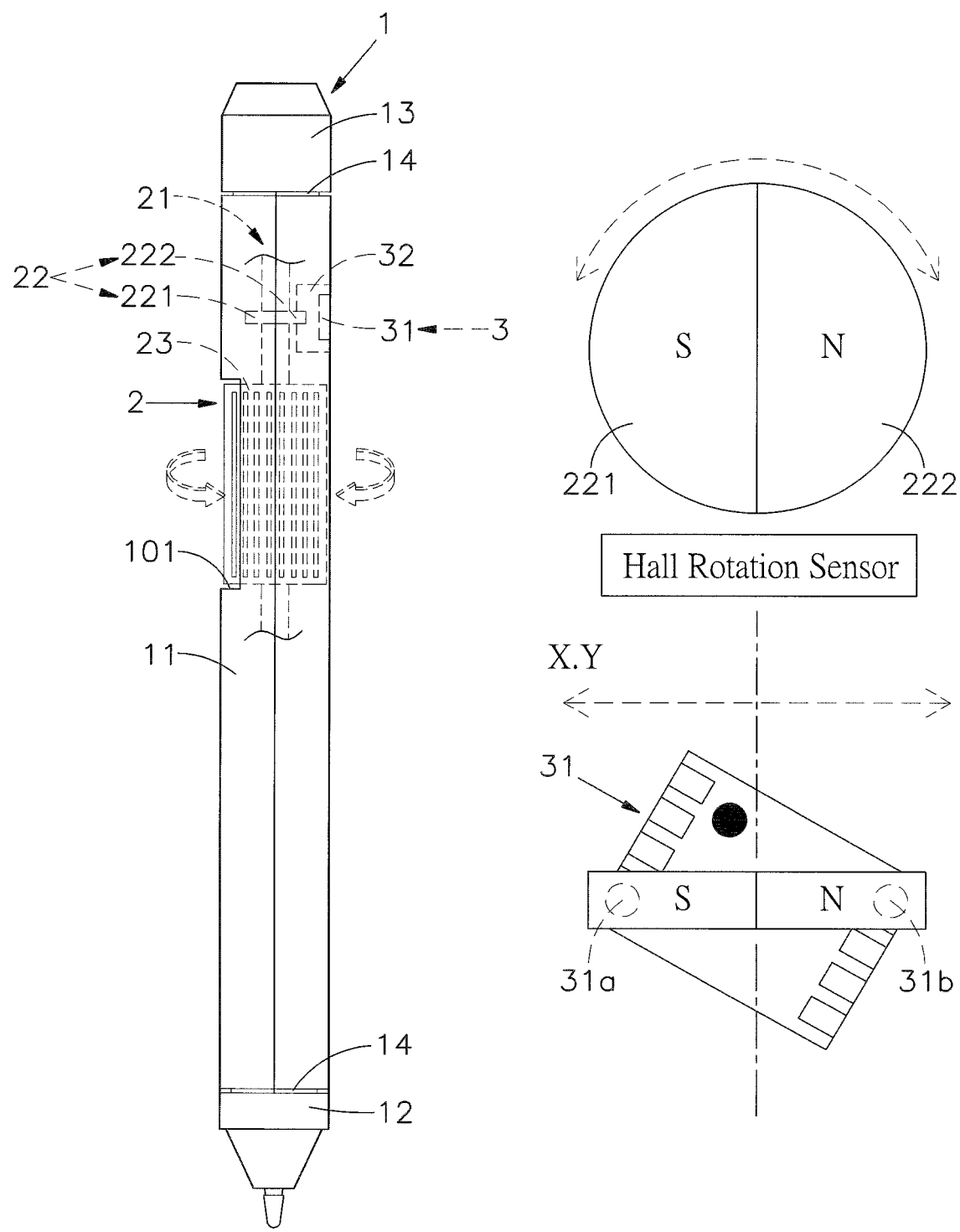
FIG. 5 is a schematic view of magnetic induction manner between the magnetic component and the magnetic induction device, in accordance with the present disclosure.
Figure 6:
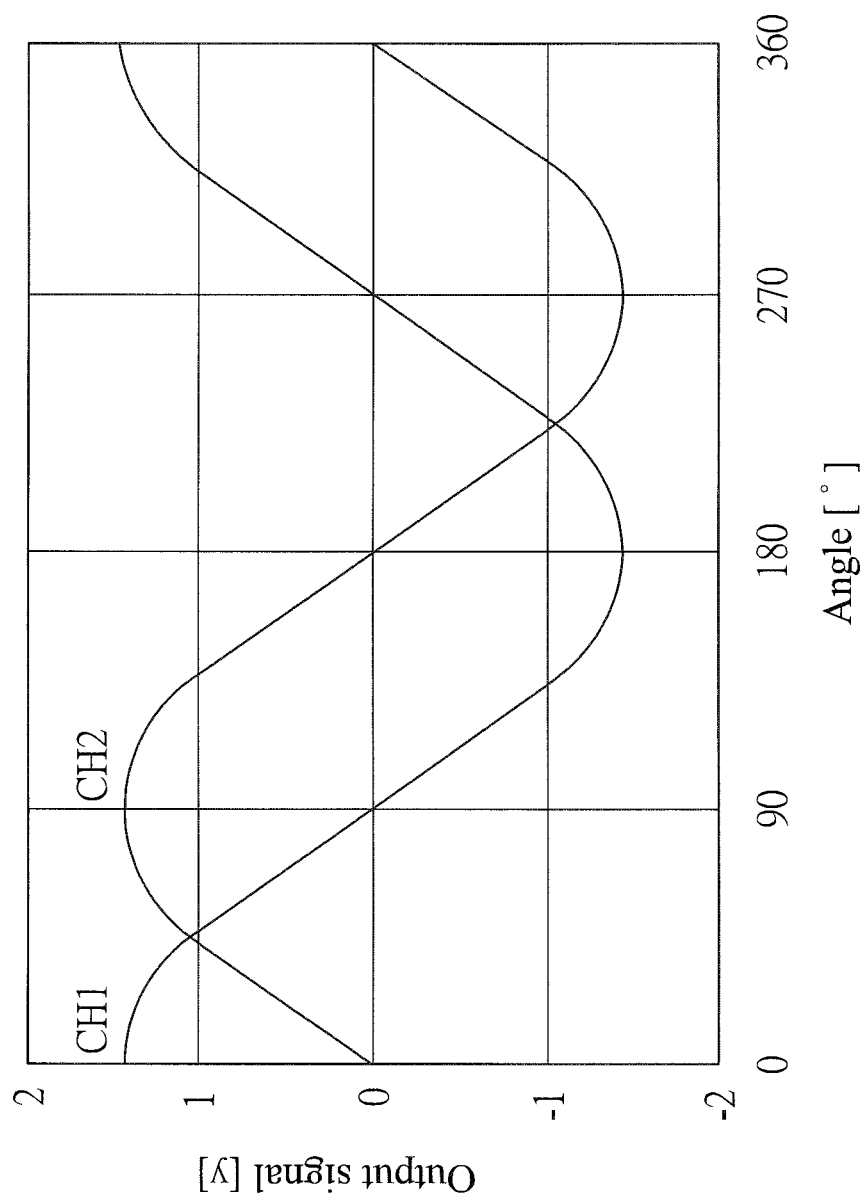
FIG. 6 is a schematic view of variation of angular momentum sensed by the two sensing points of the magnetic induction device of the present disclosure.

Please refer to FIGS. 3 through 9, which show exploded view and sectional side view of the stylus of the present disclosure, schematic view of magnetic induction manner between the magnetic component and the magnetic induction device, and the variation of angular momentum sensed by the two sensing points of the magnetic induction device, an elevational view of a part of a preferred embodiment of the stylus, a flowchart showing the steps of the operation method, and an exploded view of another embodiment of the stylus, in accordance with the present disclosure, respectively. The wheel 2 is provided with the annular magnetic component 22 disposed on the central axis 21 above or below the hole 101 of the pen holder 1, and the magnetic induction device 3 is disposed on the inner wall of the accommodation space 10 inside the pen holder 1 and opposite to position of the magnetic component 22. Preferably, the magnetic component 22 can be an annular magnet having at least two S and N magnetic poles 221 and 222. Preferably, the magnetic induction device 3 can be a Hall sensor 31, the two magnetic induction sensing points 31a and 31b located on the same diagonal line or two different corner positions can be used to sense the variation of angular momentum or angular velocity of magnetic field lines of S and N magnetic poles 221 and 222 of the magnetic component 22, as shown in FIGS. 5 and 6. Preferably, the Hall sensor 31 is also called a Hall rotation sensor, and can be implemented by an IQS chip or other sensor chip having equivalent effect. In this example, the IQS624 chip is taken as example for following illustration. The two sensing points 31a and 31b are separately located on the diagonal line, so the chip can be disposed at an angle with the annular magnet, to keep the annular magnet and the two sensing points 31a and 31b at the same plane; alternatively, the diagonal line where the two sensing points 31a and 31b are located can be perpendicular to the central axis 21 or at an specific angle with the central axis 21. As shown in FIG. 6, when the annular magnet is rotated, the two sensing points 31a and 31b of the Hall sensor 31 individually sense the variations of different magnetic field lines and output two different voltage signals CH1 and CH2, so as to simulate the movement of the annular magnet in a two-dimensional plane coordinate, and further calculate the movement signal per unit time.

The manner of using the accommodation space 10 of the pen holder 1 to accommodate the wheel 2 and the magnetic induction device 3 can reduce a quantity of the components of the stylus, so that the size of the stylus is not enlarged too much, thereby facilitating the user to hold and apply the stylus.

Figure 7:
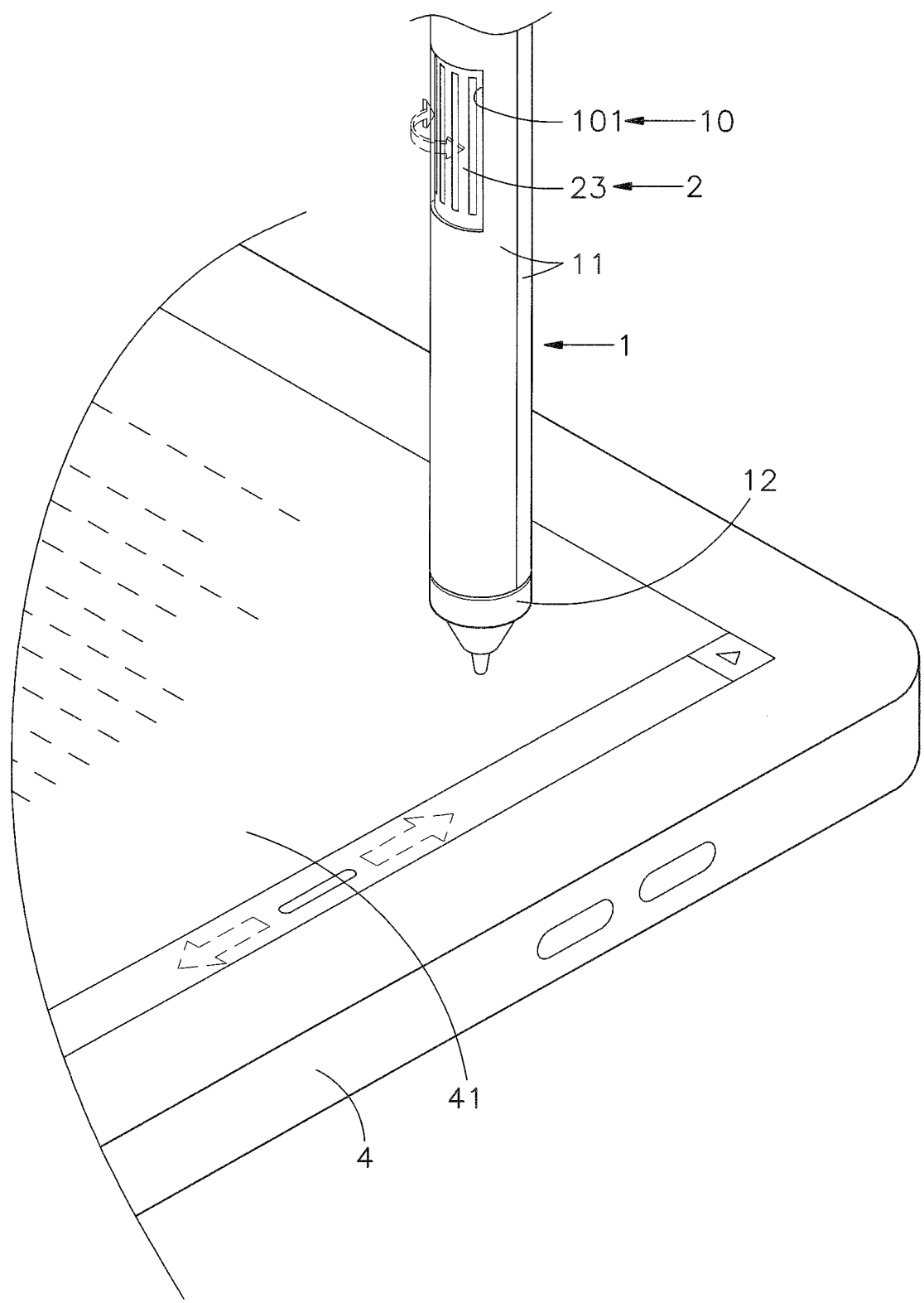
FIG. 7 is an elevational view of a part of the stylus of the present disclosure.

Furthermore, the magnetic induction device 3 can be positioned on the inner wall of the accommodation space 10 of the pen holder 1, and the two sensing points 31a and 31b of the magnetic induction device 3 can be located on the same diagonal line or two different corner positions. The two sensing points 31a and 31b of the magnetic induction device 3 can sense and calculate the variation of angular momentum (as shown in FIG. 7) or angular momentum of rotation of magnetic field lines of the S and N magnetic poles 221 and 222, which are magnetic poles with different phase angles, of the magnetic component 22. Alternatively, the magnetic induction device 3 can be located at a 45° of angle with the central axis 21 of the wheel 2, and disposed on the inner wall of the accommodating space 10 of the pen holder 1, so as to keep the two sensing points 31a and 31b of the magnetic induction device 3 and the magnetic component 22 at the same two-dimensional plane, thereby using the two sensing points 31a and 31b of the magnetic induction device 3 to sense the variation of angular momentum or angular velocity of the magnetic field lines produced by the S magnetic pole 221 and the N magnetic pole 222 of the magnetic component 22.

The following describes the operation method of using the stylus to control an operation of the preset electronic device 4. The operation method incudes following steps A01 through A06.

In the step (A01), a part of the periphery of the wheel 2 is exposed out of the hole 101 of the pen holder 1, so that the user can operate and rotate the wheel 2 by single hand.

In the step (A02), when the wheel 2 is rotated, the angular momentum or the angular velocity of the magnetic field lines produced by the S magnetic pole 221 and the N magnetic pole 222 of the magnetic component 22 on the central axis 21 of the wheel 2 varies.

In the step (A03), two sensing points 31a and 31b of the magnetic induction device 3 senses the variation of the magnetic field lines of the S magnetic pole 221 and the N magnetic pole 222 of the magnetic component 22, and the magnetic induction device 3 then converts the sensed data into the movement signal per unit time of rotation of the wheel 2.

In the step (A04), the movement signal per unit time is transmitted to the circuit board 32 having the wireless signal module, and the wireless signal is then transmitted to a preset electronic device 4 through the wireless signal module wirelessly. Preferably, the wireless signal module can be Bluetooth or RF wireless signal emission unit.

In the step (A05), after the wireless signal receiving unit (such as the Bluetooth or RF wireless signal receiving unit) built in the preset electronic device 4 receives the wireless signal, the wireless signal is transmitted to the processing unit (such as OS system or signal processor) built in the preset electronic device 4.

In the step (A06), the stylus is able to precisely control the movement distance of the window screen displayed on a screen 41 of the preset electronic device 4, such as in up or down, or left or right direction, so as to smoothly operate the sliding action of the window screen displayed on the screen 41 of the preset electronic device 4.

The wheel 2 and the magnetic induction device 3 are assembled in the accommodation space 10 of the pen holder 1, and the magnetic induction coupling state can be formed between the magnetic component 22 of the wheel 2 and the two sensing points 31a and 31b of the magnetic induction device 3 during rotation without consuming the power of the power source 15, so that the magnetic induction coupling state between the magnetic component 22 and the two sensing points 31a and 31b of the magnetic induction device 3 can be prevented from being affected by the power state of the power source 15, and it indicates that the magnetic induction coupling state can be prevented from being interrupted, paused, delayed or terminated, and can be used to control the window screen displayed on the screen 41 of the preset electronic device 4 to smoothly perform sliding operation, page changing operation or browse operation.

Figure 9:
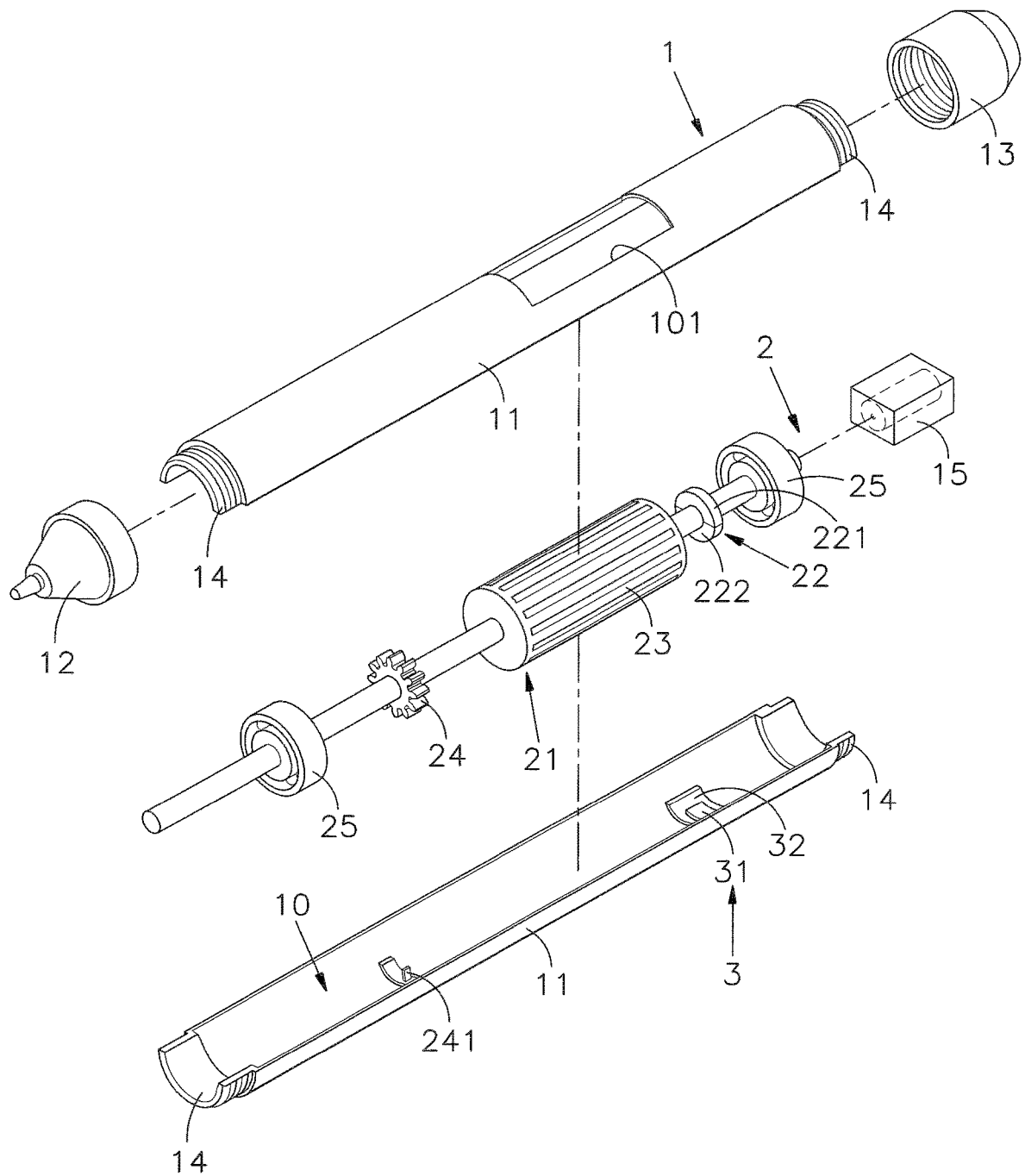
FIG. 9 is an exploded view of another embodiment of the stylus of the present disclosure.

Please refer to FIGS. 3, 4 and 9, which show exploded view and sectional side view of the stylus of the present disclosure, and an exploded view of another embodiment of the stylus of the present disclosure. The wheel 2, which is disposed inside the accommodation space 10 of the pen holder 1, includes at least one gear 24 inserted through the central axis 21 thereof. At least one spring clip 241 is formed on the inner wall of the accommodation space 10 opposite to the gear 24, and when the gear 24 is rotated along with the wheel 2, the spring clip 241 can be triggered by the gear 24 to produce a sound or a touch feedback. Furthermore, the stylus can further include at least one bearing 25 mounted on the central axis 21 of the wheel 2 and abutted with the inner wall of the accommodation space 10 by an outer periphery thereof, so that the central axis 21 of the wheel 2 can be stably supported by the at least one bearing 25, thereby preventing the central axis 21 and the wheel 2 from being unstably shaken or shifted during rotation.

In the stylus of the present disclosure, the two sensing points 31a and 31b of the magnetic induction device 3 can sense the variation of angular momentum or angular velocity of magnetic field lines of S and N magnetic poles 221 and 222 of the magnetic component 22, so as to precisely control the movement of the display screen of the screen 41 of the preset electronic device 4, such as, in up or down direction, or in left or right direction. As a result, the stylus of the present disclosure has below advantages.

First, compared with the conventional stylus, the size of the pen holder 1 can be prevented from being enlarged a lot because fewer components including the wheel 2 and the magnetic induction device 3 only, are assembled inside the accommodation space 10 of the pen holder 1; furthermore, the assembly operation of the stylus of the present disclosure is also convenient, time saving and labor-saving.

Secondly, the annular magnetic component 22 on the central axis 21 of the wheel 2 can be sensed by the two sensing points 31a and 31b of the magnetic induction device 3 positioned on the inner wall of the accommodation space 10 of the pen holder 1, so as to form the non-contact rotary magnetic coupling effect. Compared with the mechanical contact operation mode of the conventional stylus, the two sensing points 31a and 31b of the magnetic induction device 3 can sense the magnetic component 22 with better sensitivity.

Thirdly, the wheel 2 and the magnetic induction device 3 are assembled in the accommodation space 10 of the pen holder 1 and do not need power of the power source 15 such as battery, so the density of the magnetic field line produced by the S and N magnetic poles 221 and 222 of the magnetic component 22 on the central axis 21 of the wheel of is not affected by the power state of the power source 15, to prevent the magnetic induction coupling effect between the two sensing points 31a and 31b on the magnetic induction device 3 and the magnetic component 2 from being delayed, and further prevent the operation of the display screen of the screen 41 of the preset electronic device 4 from being delayed, paused or terminated.

There are various embodiments derived from the simple modification and the equivalent structure of the specification and the drawings of the present disclosure. The embodiment will be described below. Please refer to FIGS. 10 and 11. When the mechanism of the stylus can tilt the chip to make the two sensing points 31a and 31b in the same plane with the annular magnet or the diagonal line where the two sensing points 31a and 31b are disposed is directly perpendicular to the central axis 21 or are in a specific included angle to the central axis 21, the magnetic induction device 3 can sense the change in the angular momentum or the angular velocity of the magnetic field lines; furthermore, changing the positions of the magnetic component 22 and the magnetic induction device magnetic induction device is also within the scope of the present disclosure.

Figure 10:
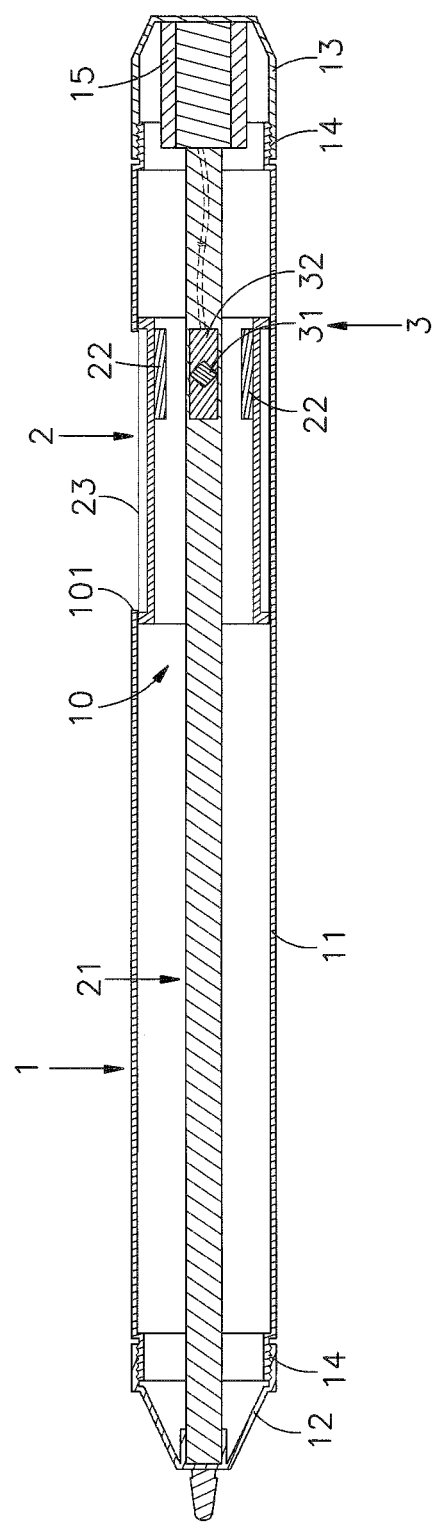
FIG. 10 is a sectional side view of the stylus of other embodiment of the present disclosure.

As shown in FIG. 10, the stylus with a magnetic induction wheel according to the present disclosure includes the pen holder 1, the wheel 2 and the magnetic induction device 3. The wheel 2 can be replaced by a hollow wheel or a sleeve-shaped roller, so that the central axis 21 can be extended through and out of the two opposite sides of the wheel. IT should be noted that the magnetic component 22 is not disposed on either side of the central axis 21. Compared with the above embodiments, the magnetic component 22 is changed in position and attached to the inner wall surface of the wheel 2. Preferably, the magnetic component 22 can be an annular magnet, and the magnetic induction device 3 is disposed in the inner hollow space of the wheel 2 and on the central axis 21 of the pen holder 1, and the magnetic induction device 3 can be a Hall sensor 31. In the case of using an IQS624 chip as the Hall sensor 31, the two sensing points 31a and 31b are still in the same two-dimensional plane with the annular magnet or the diagonal line where the two sensing points 31a and 31b are directly perpendicular to the central axis 21. While the wheel 2 rotates, the magnetic component 22 rotates about the central axis 21, so that the magnetic induction device 3 can sense the change in the angular momentum or the angular velocity of magnetic field lines during rotation of the magnetic component 22, so as to control the movement of the window screen.

Figure 11:
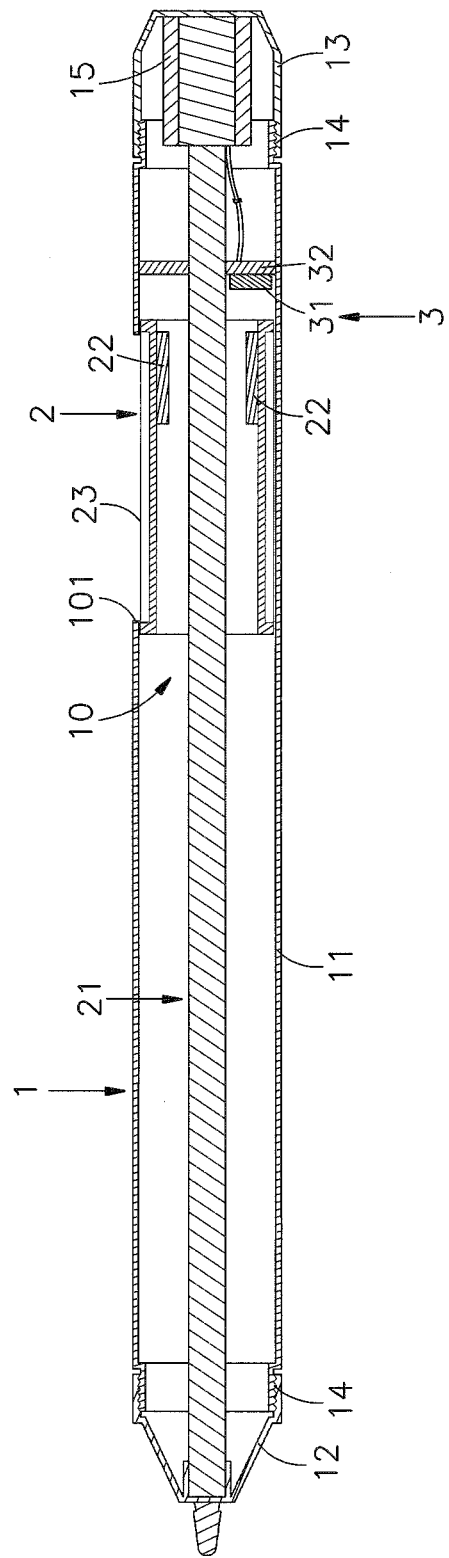
FIG. 11 is a sectional side view of the stylus of alternative embodiment of the present disclosure.

As shown in FIG. 11, the wheel 2 is also a hollow wheel or a sleeve-shaped wheel, and the magnetic induction device 3 is also a Hall sensor 31 which can be implemented by the IQS624 chip, for example. The position of the magnetic induction device 3 is changed in this embodiment. The Hall sensor 31 is not located in the inner hollow space of the rotating roller 2, or on the central axis 21, or on the inner wall surface of the pen holder 1; instead, the Hall sensor 31 is disposed on a circuit board, which is perpendicular to the central axis 21, and located adjacent to the annular magnet 22. This mechanism design can maintain the two sensing points 31a and 31b in the same two-dimensional plane as the annular magnet, or on the diagonal line directly perpendicular to the central axis 21. Therefore, while the rotating roller 2 rotates, the magnetic induction device 3 also rotates, so that the change in the angular momentum or the angular velocity of the magnetic component 22 can be detected, thereby controlling the window screen to move.

As shown in FIGS. 10 and 11, the geometry of the magnetic element 22 does not affect the magnetic coupling effect of the magnetic induction device 3, so that the mechanism of the stylus with the magnetic induction wheel according to the present disclosure can be various. In other embodiment, the above mechanism or components can be changed in position, as long as the magnetic induction device 3 of the stylus is the Hall sensor 31 having two sensing points 31a and 31b, and the two sensing points 31a and 31b are disposed on the same diagonal line or at different corner positions, and the magnetic coupling between the magnetic induction device 3 and the magnet can be formed by disposing the two sensing points 31*a*, 31*b* and the magnet on the same two-dimensional plane or the diagonal line where the two sensing points 31*a* and 31*b* are disposed in a 90 degrees or specific included angle to the central axis 21, and then the change in the angular momentum of the magnetic field line can be sensed during rotation of the wheel, thereby achieving the effect of controlling the signal. These embodiments and modifications are within the scope of the present disclosure.

Therefore, the main concept of the present disclosure is to develop the stylus with magnetic induction wheel, the hollow accommodation space is defined inside the pen holder of the stylus, and the stylus head is disposed at an end of the stylus, the hole is formed on a side of the accommodation space and penetrated through to the outside of the pen holder, the wheel is assembled in the accommodation space and aligned with the hole, and a part of the periphery of the wheel is exposed out of the hole, the wheel includes the central axis disposed two sides thereof, the magnetic component is disposed on the central axis, the magnetic induction device is disposed on the inner wall of the accommodation space of the pen holder opposite to the magnetic component, and the magnetic induction device is aligned with the periphery of the magnetic component, the two sensing points of the magnetic induction device are used to sense the variation of angular momentum or angular velocity of the magnetic field lines of the magnetic component, and the sensed data is transmitted to the preset electronic device wirelessly, so as to control the display screen displayed on the screen of the preset electronic device to perform sliding or page changing operation. There are few components assembled inside the pen holder, so the size of the pen holder is not enlarged a lot, and the user can hold and operate the stylus easily. The manner of sensing the variation of the magnetic field lines of the magnetic component based on the magnetic induction effect has better sensitivity of sensing signal, so as to prevent the operation of sliding or browsing page from being delayed, paused or terminated.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A stylus with a magnetic induction wheel, and the stylus comprising:
   a pen holder comprising a stylus head disposed an end thereof and defining a hollow accommodation space formed inside and provided with a hole formed on a side thereof and penetrated through to the outside;
   a wheel assembled inside the accommodation space of the pen holder and aligned with the hole, and comprising a central axis located inside the accommodation space and protruded on two sides thereof, and a magnetic component having S and N magnetic poles disposed on the central axis; and
   a magnetic induction device disposed on an inner wall of the accommodation space of the pen holder, and comprising two sensing points disposed thereon and configured to sense variations of magnetic field lines produced by the S and N magnetic poles of the magnetic component during rotation of the magnetic component;
   wherein the wheel is provided with an annular magnetic component disposed on the central axis above or below the hole of the pen holder, and the magnetic induction device is disposed on the inner wall of the accommodation space of the pen holder correspondingly in position to the magnetic component.

2. The stylus according to claim 1, wherein the pen holder comprises two rods opposite to each other, and the stylus head and a pen cap which both are respectively disposed at two opposite ends of the two rods, wherein the accommodation space is formed inside the two rods between the stylus head and the pen cap, and provided with the hole formed on a surface of the two rods, and a part of periphery of the wheel is exposed out of the hole.

3. The stylus according to claim 2, wherein the two rods comprise butt joint parts disposed between the stylus head and the pen cap on the two opposite ends thereof, and the butt joint parts are configured to assemble with each other, and each of the butt joint parts is provided with an inner thread and an outer thread, a shaft and an axle hole, or a tenon and a fastening slot respectively formed between the stylus head and the pen cap, and the two opposite ends of the two rods.

4. The stylus according to claim 1, wherein the magnetic component is an annular magnet comprising at least two S and N magnetic poles opposite to each other and configured to produce the variation of magnetic field lines during rotation.

5. The stylus according to claim 1, wherein the magnetic induction device is a Hall sensor disposed on the inner wall of the accommodation space inside the pen holder near the magnetic component, and the magnetic induction device is provided with two sensing points located on a diagonal line or two different corner positions to form magnetic coupling with the magnetic component, so as to sense the variation of angular momentum or angular velocity of the magnetic field lines produced by the S and N magnetic poles of the magnetic component.

6. The stylus according to claim 5, wherein the diagonal line where the two sensing points of the magnetic induction device are located is perpendicular to the central axis.

7. The stylus according to claim 1, wherein the wheel comprises at least one gear inserted through the central axis thereof, and at least one spring clip formed on the inner wall of the accommodation space opposite to the at least one gear and configured to produce a sound or feedback when the at least one gear is rotated.

8. The stylus according to claim 1, further comprising at least one bearing mounted on the central axis of the wheel, and abutted with the inner wall of the accommodation space by an outer periphery thereof.

* * * * *